(12) United States Patent
Yancey et al.

(10) Patent No.: US 8,898,287 B2
(45) Date of Patent: Nov. 25, 2014

(54) SYSTEM, METHOD AND COMPUTER PROGRAM PRODUCT FOR MONITORING DATA ACTIVITY UTILIZING A SHARED DATA STORE

(75) Inventors: Scott Yancey, San Francisco, CA (US); Scott Hansma, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 86 days.

(21) Appl. No.: 13/034,690

(22) Filed: Feb. 24, 2011

(65) Prior Publication Data

US 2011/0208858 A1    Aug. 25, 2011

Related U.S. Application Data

(60) Provisional application No. 61/307,790, filed on Feb. 24, 2010.

(51) Int. Cl.
| | | |
|---|---|---|
| G06F 15/173 | (2006.01) | |
| G06F 15/16 | (2006.01) | |
| G06F 17/30 | (2006.01) | |
| H04L 12/26 | (2006.01) | |

(52) U.S. Cl.
CPC ...... *H04L 43/0876* (2013.01); *G06F 17/30312* (2013.01); *H04L 43/067* (2013.01); *H04L 43/0817* (2013.01); *G06F 15/173* (2013.01)
USPC ............ 709/224; 709/203; 709/214; 709/227

(58) Field of Classification Search
USPC ....................................................... 709/224
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,852,714 | A * | 12/1998 | Tseng et al. ............. 726/5 |
| 5,873,096 | A | 2/1999 | Lim et al. |
| 5,917,429 | A * | 6/1999 | Otis et al. ......... 340/870.31 |
| 5,918,159 | A | 6/1999 | Fomukong et al. |
| 5,956,400 | A * | 9/1999 | Chaum et al. .......... 713/167 |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |

(Continued)

OTHER PUBLICATIONS

Goddard, T. "Using NETCONF over the Simple Object Access Protocol (SOAP)," RFC 4743, Dec. 2006.*

(Continued)

*Primary Examiner* — Melvin H Pollack
(74) *Attorney, Agent, or Firm* — Zilka-Kotab, PC

(57) ABSTRACT

In accordance with embodiments, there are provided mechanisms and methods for monitoring data activity utilizing a shared data store. These mechanisms and methods for monitoring data activity utilizing a shared data store can enable enhanced data monitoring, more efficient data storage, improved system resource utilization, etc.

24 Claims, 6 Drawing Sheets

(56) References Cited

U.S. PATENT DOCUMENTS

| | | | |
|---|---|---|---|
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,865,596 B2* | 1/2011 | Grosner et al. | 709/226 |
| 7,937,325 B2* | 5/2011 | Kumar et al. | 705/42 |
| 8,010,703 B2* | 8/2011 | Hubbard et al. | 709/246 |
| 8,015,343 B2* | 9/2011 | Garman et al. | 711/100 |
| 8,015,495 B2 | 9/2011 | Achacoso et al. | |
| 8,069,242 B2* | 11/2011 | Hadar et al. | 709/224 |
| 8,082,301 B2 | 12/2011 | Ahlgren et al. | |
| 8,082,400 B1* | 12/2011 | Chang et al. | 711/147 |
| 8,095,413 B1 | 1/2012 | Beaven | |
| 8,095,594 B2 | 1/2012 | Beaven et al. | |
| 8,121,024 B1* | 2/2012 | Natarajan et al. | 370/214 |
| 8,230,046 B2* | 7/2012 | Jiang | 709/219 |
| 8,239,227 B2* | 8/2012 | Megiddo et al. | 705/7.11 |
| 8,271,653 B2* | 9/2012 | DeHaan | 709/226 |
| 8,275,836 B2 | 9/2012 | Beaven et al. | |
| 8,280,790 B2* | 10/2012 | Lappas et al. | 705/34 |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0177635 A1* | 8/2005 | Schmidt et al. | 709/226 |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2008/0091806 A1* | 4/2008 | Shen et al. | 709/223 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0106571 A1* | 4/2009 | Low et al. | 713/310 |
| 2009/0177744 A1 | 7/2009 | Marlow et al. | |
| 2010/0057757 A1* | 3/2010 | Blondi et al. | 707/100 |
| 2010/0106764 A1* | 4/2010 | Chadwick et al. | 709/202 |
| 2010/0138488 A1* | 6/2010 | Fletcher et al. | 709/203 |
| 2010/0192207 A1* | 7/2010 | Raleigh | 726/6 |
| 2010/0199042 A1* | 8/2010 | Bates et al. | 711/114 |
| 2010/0199188 A1* | 8/2010 | Abu-Hakima et al. | 715/733 |
| 2011/0055368 A1* | 3/2011 | Colrain et al. | 709/223 |
| 2011/0107241 A1* | 5/2011 | Moore | 715/760 |
| 2011/0113115 A1* | 5/2011 | Chang et al. | 709/213 |
| 2011/0119328 A1* | 5/2011 | Simitci et al. | 709/203 |
| 2011/0138027 A1* | 6/2011 | Friedmann et al. | 709/223 |
| 2011/0145383 A1* | 6/2011 | Bishop et al. | 709/223 |
| 2011/0145413 A1* | 6/2011 | Dawson et al. | 709/226 |
| 2012/0042010 A1* | 2/2012 | Rosenfield et al. | 709/203 |
| 2012/0290702 A1* | 11/2012 | Vincent | 709/223 |

(56) References Cited

U.S. PATENT DOCUMENTS

| | | | |
|---|---|---|---|
| 2012/0324060 A1* | 12/2012 | Afergan et al. | 709/219 |
| 2013/0218948 A1 | 8/2013 | Jakobson | |
| 2013/0218949 A1 | 8/2013 | Jakobson | |
| 2013/0218966 A1 | 8/2013 | Jakobson | |

OTHER PUBLICATIONS

Hammer-Lahav, E. "The OAuth 1.0 Protocol," RFC 5849, Apr. 2010.*

1 U.S. Appl. No. 60/828,192, filed Oct. 4, 2006.

* cited by examiner

SYSTEM, METHOD AND COMPUTER PROGRAM PRODUCT FOR MONITORING DATA ACTIVITY UTILIZING A SHARED DATA STORE

CLAIM OF PRIORITY

This application claims the benefit of U.S. Provisional Patent Application No. 61/307,790, entitled "Method and Systems for Metering Usage of Computational Resources," by Yancey et al., filed Feb. 24, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to activity associated with data, and more particularly to monitoring that activity.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems (e.g., multi-tenant on-demand database systems, etc.) commonly perform monitoring of data activity within the system. For example, local data within the system may be collected and stored to a local database. Unfortunately, techniques for storing and utilizing the collected data have been associated with various limitations.

Just by way of example, traditional methods of collecting and storing monitored data in a local database create a considerable load on the database and result in the retrieval of data that may be stale and less useful. Accordingly, it is desirable to provide techniques that improve the storage and utilization of monitored system data.

BRIEF SUMMARY

In accordance with embodiments, there are provided mechanisms and methods for monitoring data activity utilizing a shared data store. These mechanisms and methods for monitoring data activity utilizing a shared data store can enable enhanced data monitoring, more efficient data storage, improved system resource utilization, etc.

In an embodiment and by way of example, a method for monitoring data activity utilizing a shared data store is provided. In one embodiment, data activity is monitored within a system. Additionally, the monitored data activity is stored within a shared data store. Further, one or more actions are performed, based on the stored data activity.

While one or more implementations and techniques are described with reference to an embodiment in which monitoring data activity utilizing a shared data store is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for monitoring data activity utilizing a shared data store.

As used herein, the term multi-tenant database system, refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for monitoring data activity utilizing a shared data store will be described with reference to example embodiments.

Figure 1:
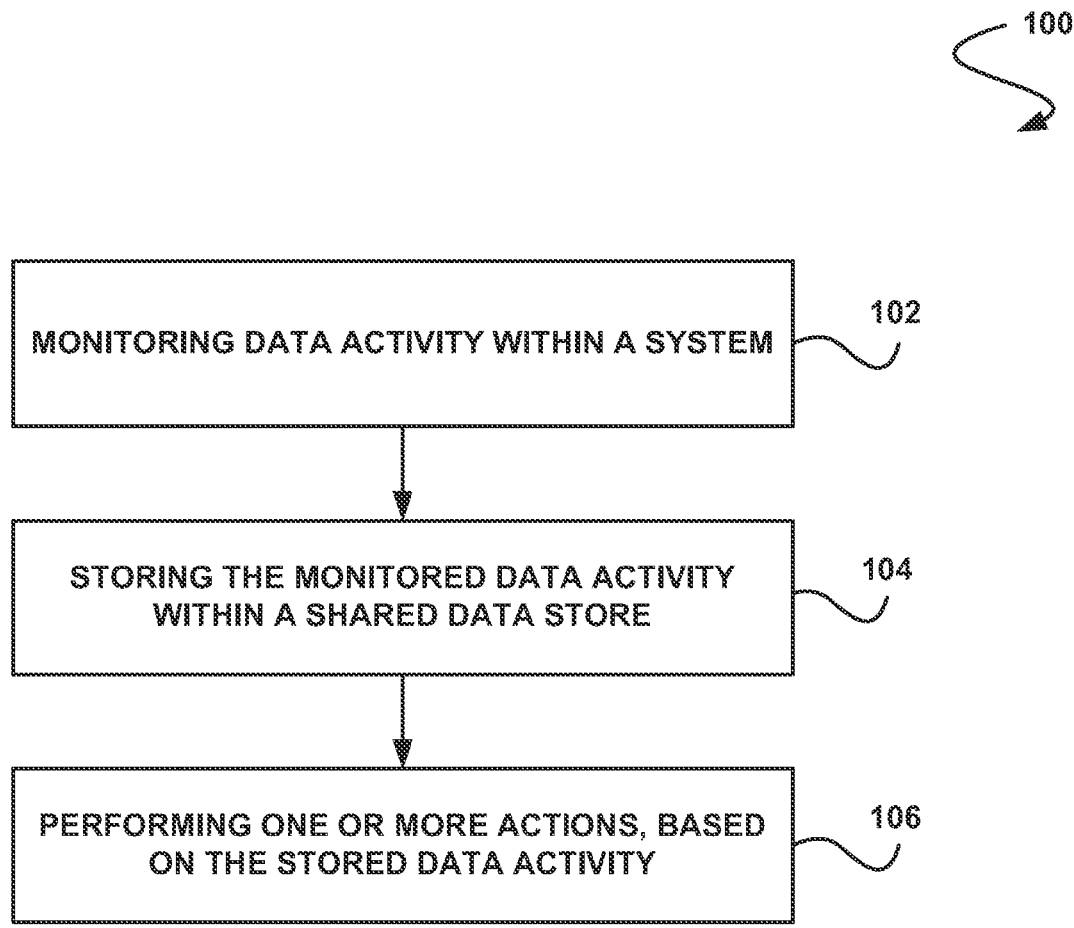
FIG. 1 illustrates a method for monitoring data activity utilizing a shared data store, in accordance with one embodiment.

FIG. 1 illustrates a method 100 for monitoring data activity utilizing a shared data store, in accordance with one embodiment. As shown in operation 102, data activity is monitored within a system. In one embodiment, the data activity may be associated with one or more users of the system. For example, the data activity may be associated with a user of the system, a customer of the system, etc. In another embodiment, the data activity may be associated with an application. For example, the data activity may be associated with a client function, an application provided by the system, etc. In yet another embodiment, the system may include one or more clients and/or servers, a multi-tenant on-demand database system, etc. For example, the system may include a plurality of servers (e.g., application servers, etc.) within a cluster.

Additionally, in another embodiment, the data activity may include an amount of data that is transferred utilizing the system. For example, the data activity may include a number of bytes of data transferred between the system and a customer. In another example, the data activity may include a number of application programming interface (API) calls made to the system by a customer. In yet another embodiment, the data activity may include an amount of processing being performed by one or more servers of the system. For example, the data activity may include a number of data requests received from a customer that are currently being serviced by one or more application servers of the system.

Further, in one embodiment, the data activity may be monitored for a predetermined amount of time. For example, the data activity may be monitored for a time period of a month, a week, twenty-four hours, etc. Of course, however, the data activity may be monitored for any period of time. In another embodiment, the data activity may include data usage at a particular point in time (e.g., a snapshot of the current activity within the system, etc.).

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, the monitored data activity is stored within a shared data store. In one embodiment, the shared data store may include an open data store. For example, the shared data store may include a general purpose distributed memory caching system (e.g., memcached, etc.).

Further still, as shown in operation 106, one or more actions are performed, based on the stored data activity. In one embodiment, the one or more actions may include creating a billing statement. For example, the one or more actions may include creating a bill and sending the bill to a customer of the system based on their monitored data activity within the system. In another embodiment, the one or more actions may include blocking or redirecting one or more elements within the system. For example, the one or more actions may include denying a request for data from a customer or function, queuing the request for data from the customer or function, etc.

In this way, the shared data store may be used instead of a database to store the monitored data activity. Additionally, the shared data store may provide a simple, easy to understand framework that may enable developers to easily meter and profile features or sub-systems of the system.

Figure 2:
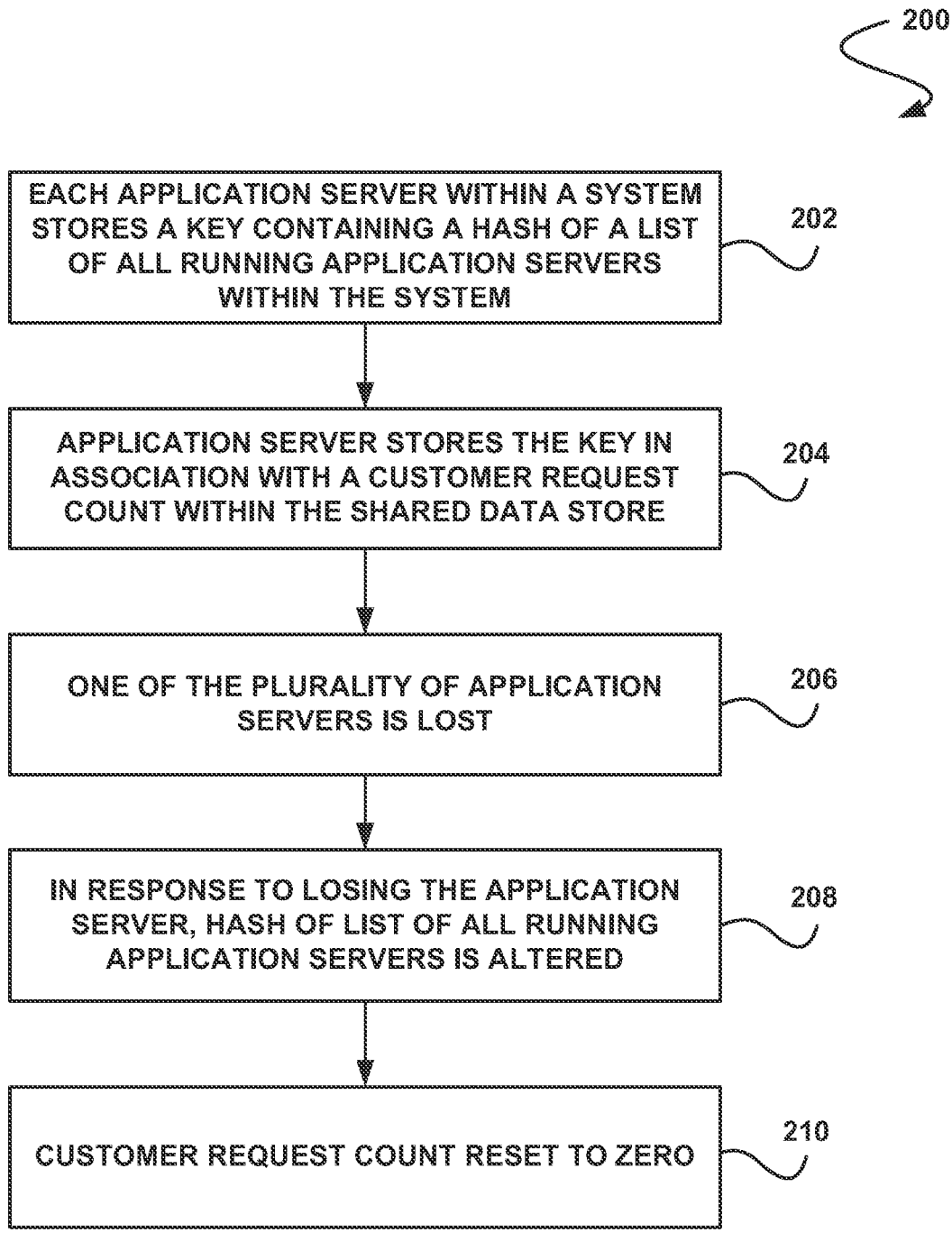
FIG. 2 illustrates a method for handling concurrent requests utilizing a shared data store, in accordance with another embodiment.

FIG. 2 illustrates a method 200 for handling concurrent requests utilizing a shared data store, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, each application server within a system stores a key containing a hash of a list of all running application servers within the system. In one embodiment, each application server may be aware of all other application servers within the system that are currently operational, and may store the key containing a hash of a list of all application servers within the system based on that knowledge.

Additionally, as shown in operation 204, the application server stores the key in association with a customer request count within the shared data store. In one embodiment, the customer request count may include a value indicative of a number of requests made to the application servers by a particular customer. In another embodiment, when a request is received and started by an application server, the customer request count is incremented. Also, in yet another embodiment, when a request is completed and ended by the application server, the customer request count is decremented.

Further, as shown in operation 206, one of the plurality of application servers within the system is lost. For example, an application server may shut down, may be non-responsive, may crash, etc. Further still, as shown in operation 208, in response to losing the application server, the hash of the list of all running application servers is altered, thereby altering the corresponding key containing the hash. Also, as shown in operation 210, the customer request count is reset to zero in response to the alteration of the hash.

In this way, if an application server that starts a request is lost, that request may not count against the customer request count, and the customer who sent the request may not be unjustly blocked due to lost updates. Additionally, if the customer request count within the shared data store is lost before one or more requests have ended, the customer request count may not be decremented below zero. This may enable the system to determine a number of outstanding requests from each customer that, are being serviced by application servers of the system, and regulate the number of allowable customer requests accordingly.

Figure 3:
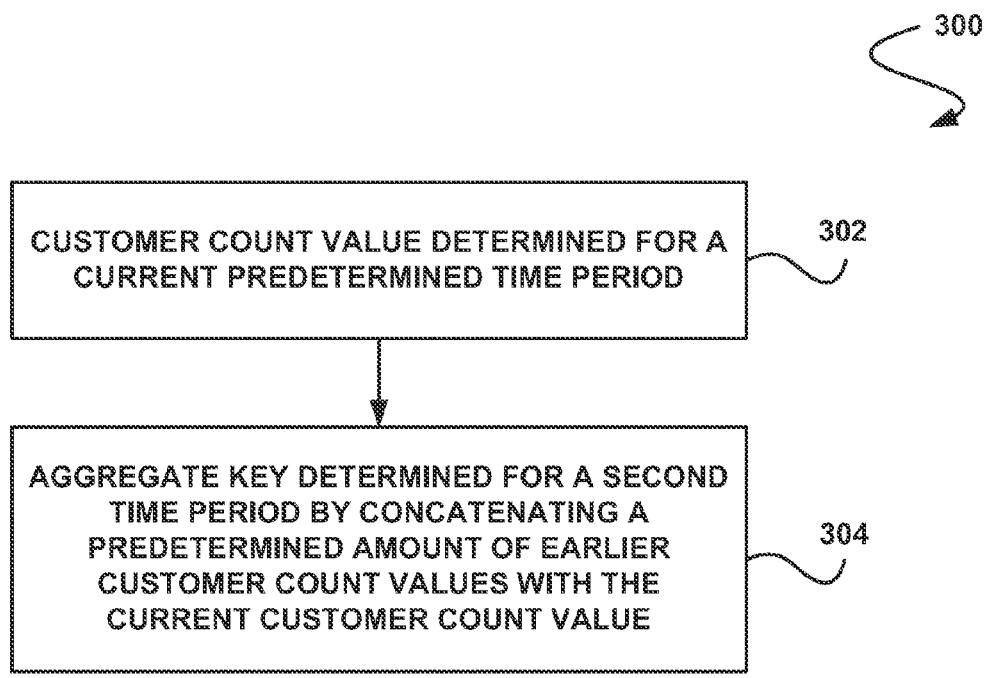
FIG. 3 illustrates a method for performing tracking with limiting utilizing a shared data store, in accordance with another embodiment.

FIG. 3 illustrates a method 300 for performing tracking with limiting utilizing a shared data store, in accordance with another embodiment. As an option, the present method 300 may be carried out in the context of the functionality of FIGS. 1-2. Of course, however, the method 300 may be carried out in any desired environment. The aforementioned definitions may apply during the present description.

As shown in operation 302, a customer count value is determined for a current predetermined time period. For example, a count value indicative of a number of requests made by a customer for a current hour time period may be determined. Additionally, as shown in operation 304, an aggregate key is determined for a second time period by concatenating a predetermined amount of earlier customer count values with the current customer count value. For example, an aggregate key may be compiled for a twenty-four hour time period by concatenating the last twenty-three customer count values with the current customer count value. In this way, a rolling twenty-four hour window may be created.

Further, in one embodiment, if the shared data store loses an aggregate value, the aggregate key may be recalculated utilizing the predetermined amount of earlier customer count values as well as the current customer count value. In this way, tracking of customer requests may be performed without persistence. Further still, a customer may be limited to a predetermined amount of requests (e.g., API calls, data requests, processing requests, etc.) over a predetermined period of time utilizing the aggregate key.

Figure 4:
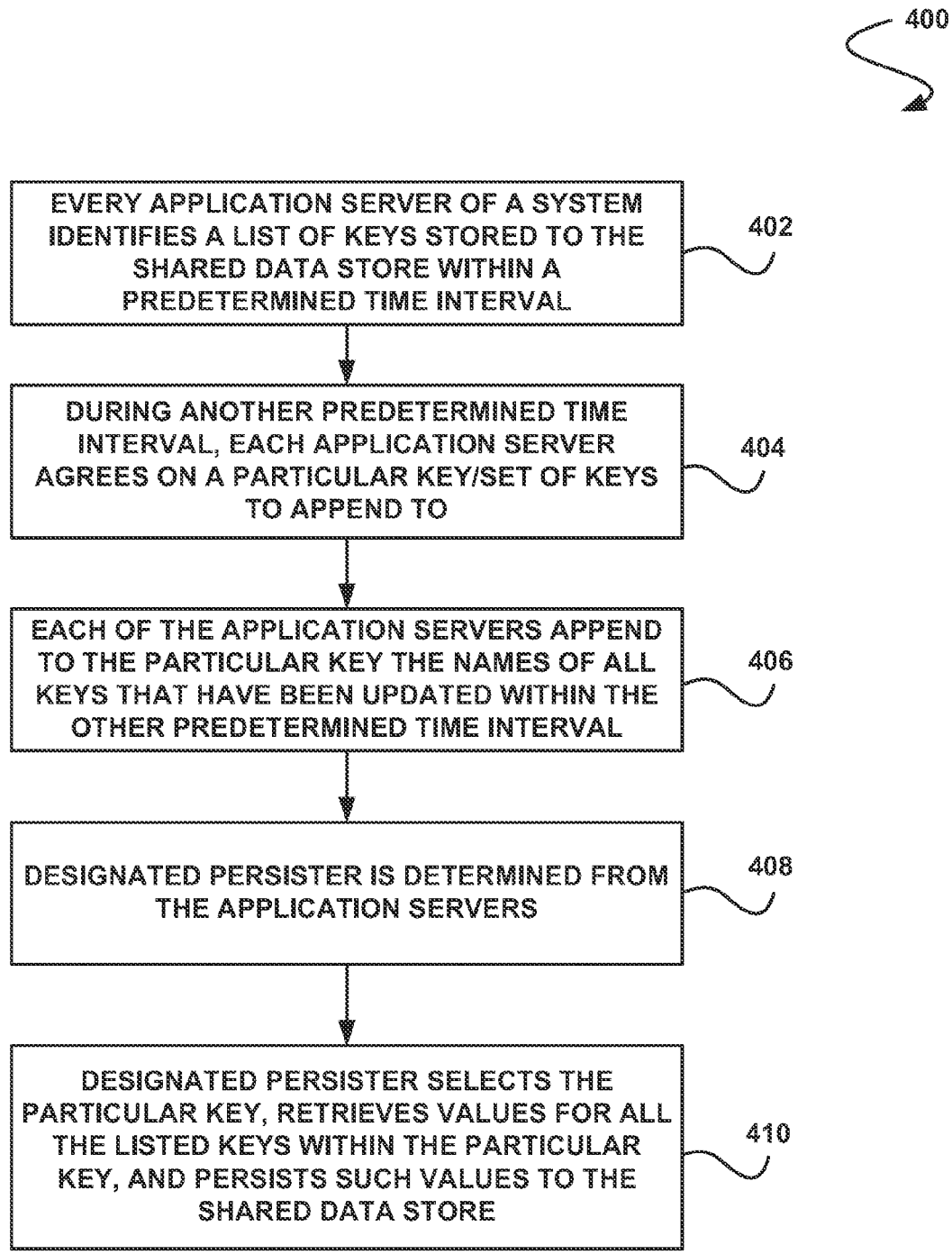
FIG. 4 illustrates a method for performing persistent data storage utilizing a shared data store, in accordance with another embodiment.

FIG. 4 illustrates a method 400 for performing persistent data storage utilizing a shared data store, in accordance with another embodiment. As an option, the present method 400 may be earned out in the context of the functionality of FIGS. 1-3. Of course, however, the method 400 may be carried out in any desired environment. The aforementioned definitions may apply during the present description.

As shown in operation 402, every application server of a system identifies a list of keys stored to the shared data store within a predetermined time interval. In one embodiment, the time interval may be one minute, five minutes, an hour, a day, etc. Additionally, as shown in operation 404, during another predetermined time interval, each application server agrees on a particular key or set of keys to append to. Further, as shown in operation 406, each of the application servers append to the particular key the names of ail keys that have been updated within the other predetermined time interval.

Further still, as shown in operation 408, a designated persister is determined from the application servers. In one embodiment, the designated persister may be elected by all of the application servers. In another embodiment, all application servers may attempt to perform as the designated persister and may become the designated persister if no other application server has indicated an attempt to become the designated persister.

Also, as shown in operation 410, the designated persister selects the particular key, retrieves values for all the listed keys within the particular key, and persists such values to the shared data store. In this way, a list of keys that have not been persisted may be stored on each application server. Additionally, a total count of activity may be stored persistently for a customer of the system during a predetermined time period for purposes of billing the customer for such activity.

Additionally, in one embodiment, a cluster aware data store may be moved from a database to memcached. Additionally, a new, simple, easy-to-understand framework may be provided that developers may use to meter and profile features or sub-systems. In another embodiment, interval based limiting may be performed in order to measure an amount of activity occurring within a predetermined time interval, and may provide ways for clients to ask for permission to perform the activity. Additionally, this data may be aggregated across all servers in a cluster. Further, when an amount of activity within a predetermined interval surpasses a threshold, then some type of policy may be enforced. For example, when an organization exceeds a predetermined number of API requests in an hour time period, then all further API requests may be blocked until the number of requests drops below the threshold again. In another embodiment, the captured data may be persisted to a database for historical or auditing purposes.

Further still, in one embodiment, concurrent based activity may measure concurrent activity, and may provide ways for clients to ask for permission to perform the activity. In another embodiment, this data may need to be aggregated across all servers in a cluster. For example, an amount of concurrent long running requests may be monitored for a given organization, and when the limit is exceeded, further requests may be denied until the amount of requests drops below the threshold. In yet another embodiment, limits may be elastic and not static. For example, an unbounded number of reports may be allowed to be concurrently run when database CPU utilization is low, but as utilization grows higher, much lower concurrent numbers may be enforced.

Also, in another embodiment, historical profiling may not include a notion of "limiting" or "restricting." Rather, it may only care about capturing events or data, possibly by time interval, that may be persisted for use by others. This data may not need to be aggregated across all servers in a cluster—rather, each server in the cluster may only need to capture and then flush its own data to some central data store. This may be thought of as a feature of resource profiling, and an example today may include capturing knowledge base article views that may only be used for reporting purposes.

Additionally, in one embodiment, one implementation may be decomposed into a manageable set of interlaces and base implementations, all of which may be hidden to clients. Rather clients may be able to use any of the supported use cases via implementations already provided, and they may customize those implementations via framework specific objects passed to constructor calls and/or factory methods. A developer wanting to track some activity, possibly with limits enforced, may code this up in minutes, not hours or days, with very few lines of new code.

Further, in another embodiment, the central data store to synchronize data across servers in the cluster may no longer be the database. For example, using clustered memcached may result in removing much of the heavy load that older designs pull on a database. In yet another embodiment, all working/transient data needed to make limiting decisions may be pushed to memcached. Oracle may no longer be involved, such that locally collected data may be flushed to memcached, and when cluster-wide data is needed to make a decision it may be retrieved from memcached.

In yet another embodiment, the memory footprint of metered data may be reduced in app servers. Additionally, all data may never be synchronized back into all application servers, but instead when a request for data is made on a given application server the values in the local data cache may be summed with the cluster's values stored in memcached, which may eliminate the need to store all cluster-wide data on each app server.

Further still, in one embodiment, the shared data store (e.g., memcached, etc.) may be a transient data store. For example, when a given memcached server in the cluster goes down, all data that was being kept on that server may be lost. In another embodiment, if an implementation cannot tolerate lossy behavior, then an Oracle specific clustered data store implementation may be used. In yet another embodiment, for implementations that may require permanent storage of their data, they may flush to Oracle from the app server's local cache independently of the flush and usage of memcached and therefore may not be affected by memcached server crashes.

In another embodiment, there may be implementations that may require interaction with Oracle. These implementations may want to preserve their data permanently (or at least for a longer period of time than the current time interval they're working in). This may apply to some "Interval Activity" and all "Historical Profiling" use case implementations. For these implementations, their flush to Oracle may not be frequent (lessening the excessive chum seen in the current RL design), and it may be a one way push (meaning they don't need to retrieve data to sync up cluster-wide activity, since cluster-wide data usage may be handled through memcached).

For example, the "Historical Profiling" use case may include flushing local cache data to Oracle once every 10 minutes. Additionally, the "Interval Activity" use case may need persistence. For example, it may frequently (e.g., every 30 seconds, 2 minutes, etc.) flush a local cache data to memcached, but may flush this same local data to Oracle once over 10 minutes.

Also, in one embodiment, for implementations that need to persist their data to Oracle, "sweeping" or purging their old data may be performed. In another embodiment, instead of requiring the client implementation to manage and write the code for this, a simple interface may be provided into defining the sweeping interval for the client's data and then handling the scheduling and executing of their data's sweeping on their behalf.

Additionally, in one embodiment, a concurrent based activity model may be introduced with elastic permitting that may enable a self-protecting system. For example, under normal load, requests to run reports may always be approved. However, as database CPU utilization on a given node climbs to a predetermined level, one or more reporting requests may be shed or delayed in response. Also, classifications and priorities of reports and customers may also be supported, such that lower priority organizations and/or historically more expensive reports may be may be shed or delayed first.

In another embodiment, Apex activity may be metered within hour intervals, and limits may be enforced after a predetermined threshold is exceeded for that time interval. Additionally, metering may be utilized to capture and/or monitor system activity. In yet another embodiment, the metering framework may take care of periodically flushing data from the appservers where activity occurs to memcached (thus adding those local values to the overall count for entire cluster). In still another embodiment, the Metering framework may also periodically flush data to Oracle, and it may reside in core.metering_count. The default flush to memcached interval may be two minutes, and to Oracle every twenty minutes. These intervals may be overridden by using methods within CountMeteringFactory that may expose these parameters.

Further, in one embodiment, metrics may be tracked over a particular time interval. For example, metrics may be tracked over a fixed day, a rolling twenty-four hour period, etc. Additionally, a rolling interval may include a period chopped into various sub-units of time, where when a new unit is "rolled into" the oldest unit "rolls off." For example, in a rolling twenty-four hour period, activity may be tracked each hour for the past twenty-four hours. Additionally, when a new hour is "rolled into" then all activity on the now twenty-fifth hour no longer counts towards the twenty four hour total.

In another embodiment, data may be permanently persisted. For example, data may be flushed to a database so that it may be used for other purposes, such as historical reporting, billing, etc. Also, in one embodiment, static limits may be used in order to enforce a fixed number of concurrent activity (e.g., an organization may only have five instances of an action occurring at any point in time, etc.). In another embodiment, fixed limits may vary by another condition. In yet another embodiment, elastic limits may be used that, vary over time. For example, a varying number of concurrent reports may be allowed to be executed based on a utilization level of a targeted node.

Further, in one embodiment, usage of computational resources may be metered to provide a general purpose resource metering framework. For example, metering may count, sum, etc, some type of activity occurring within the service, possibly on a per customer/tenant basis. It may then make this data available to all machines in the service, allowing action to be taken when thresholds are met or exceeded. This data may be made available to the service through a shared memory architecture, which may be provided via a clustered memcached caching layer. The facility may be provided to flush activity to the database in case historical records of the activity is needed.

Further still, in one embodiment, two primary methods of tracking activity are supported—an aggregate count over some window of time (say over an hour period, or rolling 24 hour period, etc.), and the amount of activity happening concurrently. For concurrent activity implementations, the limit may either be statically defined or be "elastic". For the elastic version, it may vary the amount of allowed concurrent activity based on the current levels of resource utilization for some resource that is measured. For example, the number of concurrent reports that can be running may be varied based on the current level of utilization of the database CPU. Hence, when utilization is low more reports may be allowed to be concurrently running, but when utilization is high less reports may be allowed to be concurrently running. Thus, activity tracking and concurrent (static or elastic) activity tracking may be provided. Also, in one embodiment, the metering may be performed in association with a multi-tenant on-demand database system.

System Overview

Figure 5:
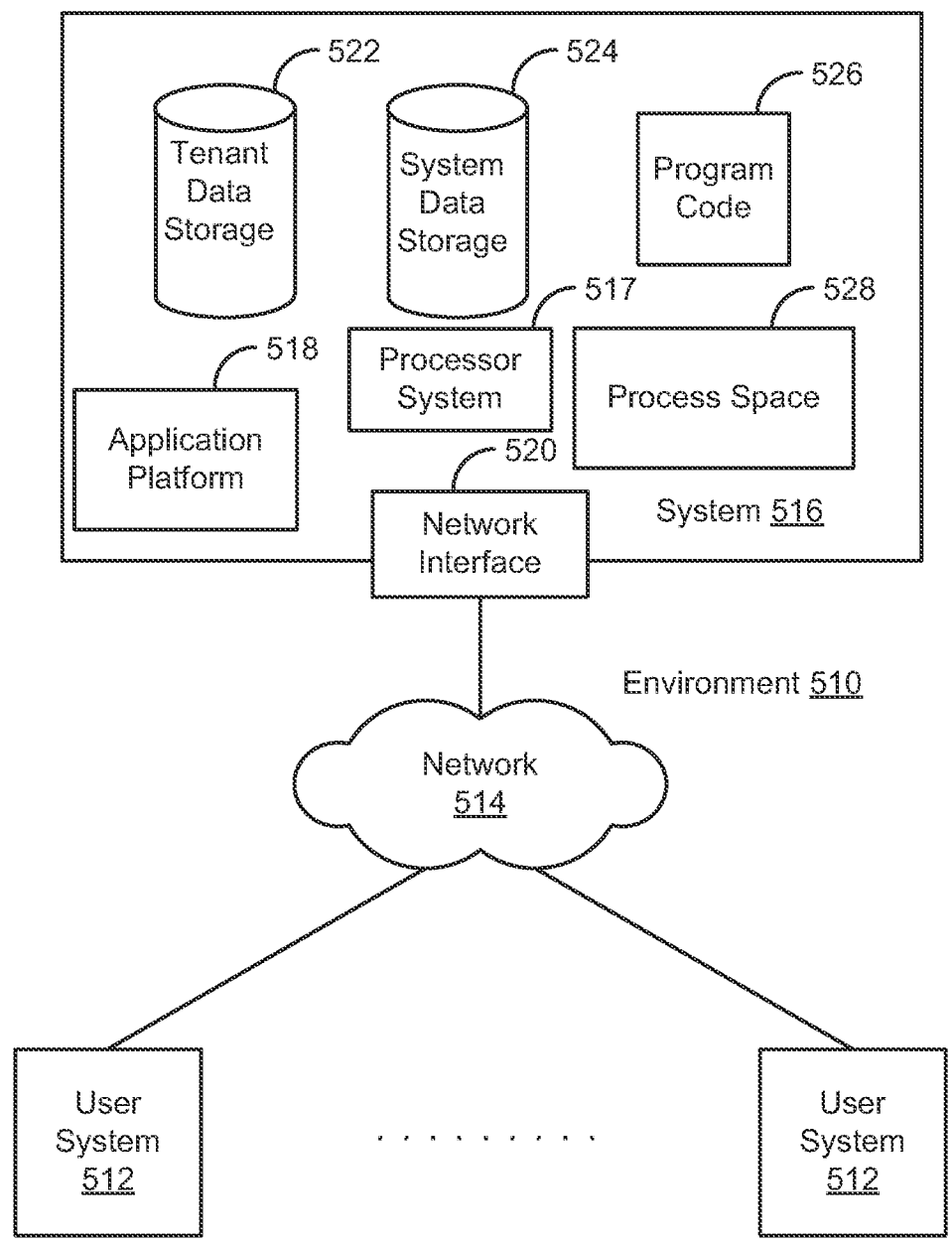
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 510 may not have ail of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application (s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
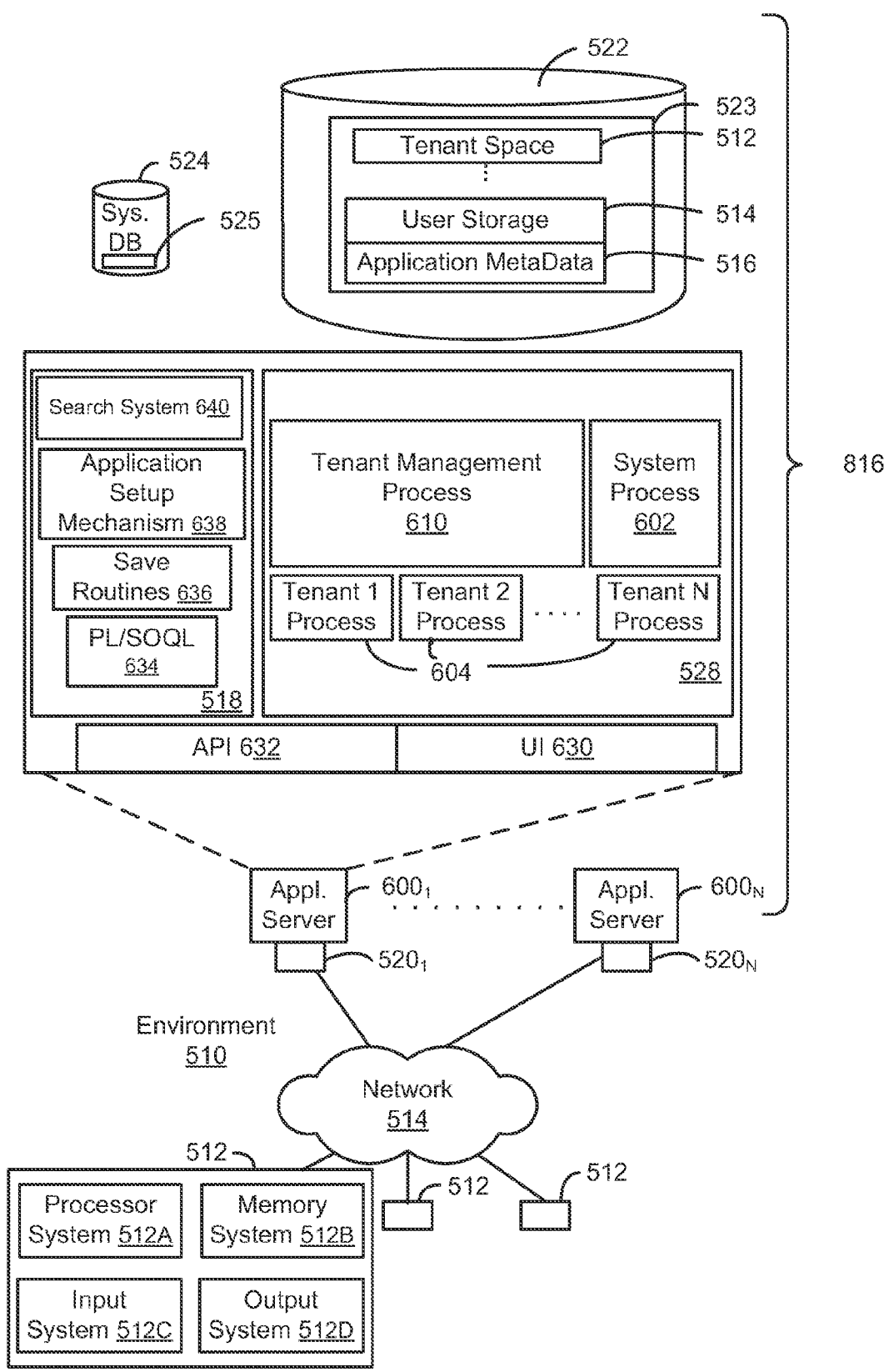
FIG. 6 illustrates a block diagram of an embodiment of elements of FIG. 4 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for monitoring data activity utilizing a shared data store, the method comprising:
   monitoring data activity including events within a system that are associated with user requests, wherein the data activity is performed across multiple servers of the system;
   storing within a shared data store, by the multiple servers of the system, information indicating the monitored data activity, wherein the shared data store includes memcached that is accessible to each of the multiple servers of the system;
   retrieving the information from the memcached; and performing one or more actions including historical profiling, based on the retrieved information, wherein the historical profiling includes reporting on the information for use by users;

wherein the indication of the monitored data activity is separately stored in a database.

2. The computer program product of claim 1, wherein the data activity is associated with one or more users of the system.

3. The computer program product of claim 1, wherein the data activity is associated with an application.

4. The computer program product of claim 1, wherein the system includes a multi-tenant on-demand database system.

5. The computer program product of claim 1, wherein the multiple servers of the system include a plurality of application servers within a cluster.

6. The computer program product of claim 1, wherein the data activity includes an amount of data that is transferred utilizing the system.

7. The computer program product of claim 1, wherein the data activity includes a number of application programming interface (API) calls made to the system by a customer.

8. The computer program product of claim 1, wherein the data activity includes an amount of processing being performed by the multiple servers of the system.

9. The computer program product of claim 1, wherein the multiple servers of the system include application servers, and the data activity includes a number of data requests received from a customer that are currently being serviced by the application servers of the system.

10. The computer program product of claim 1, wherein the data activity is monitored for a predetermined amount of time.

11. The computer program product of claim 1, wherein the data activity includes data usage at a particular point in time.

12. The computer program product of claim 11, wherein the data activity includes a snapshot of current activity within the system.

13. The computer program product of claim 1, wherein the one or more actions include queuing a request for data from a customer or function.

14. A method, comprising:
monitoring data activity including events within a system that are associated with user requests, utilizing a processor, wherein the data activity is performed across multiple servers of the system;
storing within a shared data store, by the multiple servers of the system, information indicating the monitored data activity, wherein the shared data store includes memcached that is accessible to each of the multiple servers of the system;
retrieving the information from the memcached; and
performing one or more actions including historical profiling, based on the retrieved information, wherein the historical profiling includes reporting on the information for use by users;
wherein the indication of the monitored data activity is separately stored in a database.

15. An apparatus, comprising:
a hardware processor for:
monitoring data activity including events within a system that are associated with user requests, wherein the data activity is performed across multiple servers of the system;
storing within a shared data store, by the multiple servers of the system, information indicating the monitored data activity, wherein the shared data store includes memcached that is accessible to each of the multiple servers of the system;
retrieving the information from the memcached; and
performing one or more actions including historical profiling, based on the retrieved information, wherein the historical profiling includes reporting on the information for use by users;
wherein the indication of the monitored data activity is separately stored in a database.

16. A method for transmitting code for use in a multi-tenant database system on a transmission medium, the method comprising:
transmitting code for monitoring data activity including events within a system that are associated with user requests, utilizing a processor, wherein the data activity is performed across multiple servers of the system;
transmitting code for storing within a shared data store, by the multiple servers of the system, information indicating the monitored data activity, wherein the shared data store includes memcached that is accessible to each of the multiple servers of the system;
transmitting code for retrieving the information from the memcached; and
transmitting code for performing one or more actions including historical profiling, based on the retrieved information, wherein the historical profiling includes reporting on the information for use by users;
wherein the indication of the monitored data activity is separately stored in a database.

17. The computer program product of claim 1, wherein each of the multiple servers within the system are aware of which other servers of the multiple servers are operational, and each of the multiple servers within the system store a same key containing a hash of a list of all of the operational servers within the system.

18. The computer program product of claim 17, wherein the key containing the hash of the list of all of the operational servers is stored in the shared data store in association with a customer request count, and wherein the customer request count includes a value indicative of a number of requests made to the multiple servers by a customer.

19. The computer program product of claim 18, wherein the customer request count within the shared data store is incremented when a request is received from the customer and started by one of the multiple servers.

20. The computer program product of claim 19, wherein the customer request count is decremented when the request from the customer is completed and ended by the one of the multiple servers.

21. The computer program product of claim 18, wherein, in response to one of the operational servers becoming non-responsive, the hash of the list of all of the operational servers is altered, thereby altering the key, and the customer request count is then set to zero in response to the alteration of the hash.

22. The computer program product of claim 1, wherein an indication of a completion of each user request is stored in the memcached.

23. The computer program product of claim 1, wherein the events include knowledge base article views, such that the reporting on the information for use by users includes reporting on the knowledge base article views.

24. The computer program product of claim 1, wherein the memcached is used to store the information, such that the information is retrieved from the memcached for the reporting to avoid retrieving the information from the database.

* * * * *